Oct. 15, 1935. B. L. PRENTICE 2,017,511
WINDOW FRAME CHANNEL
Filed April 29, 1932
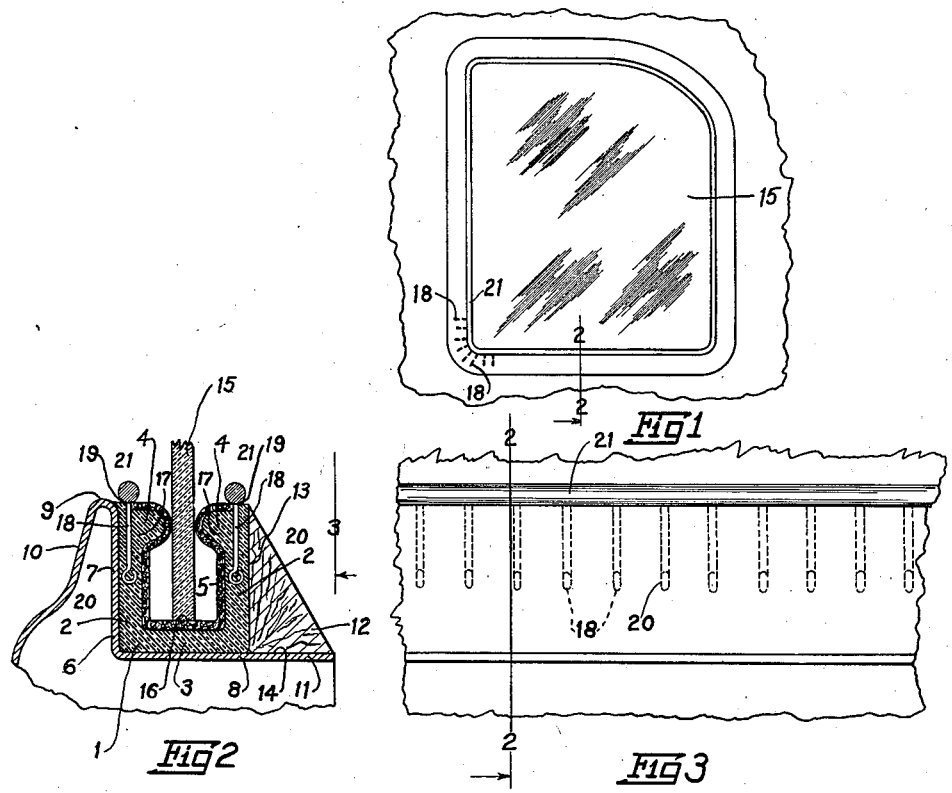
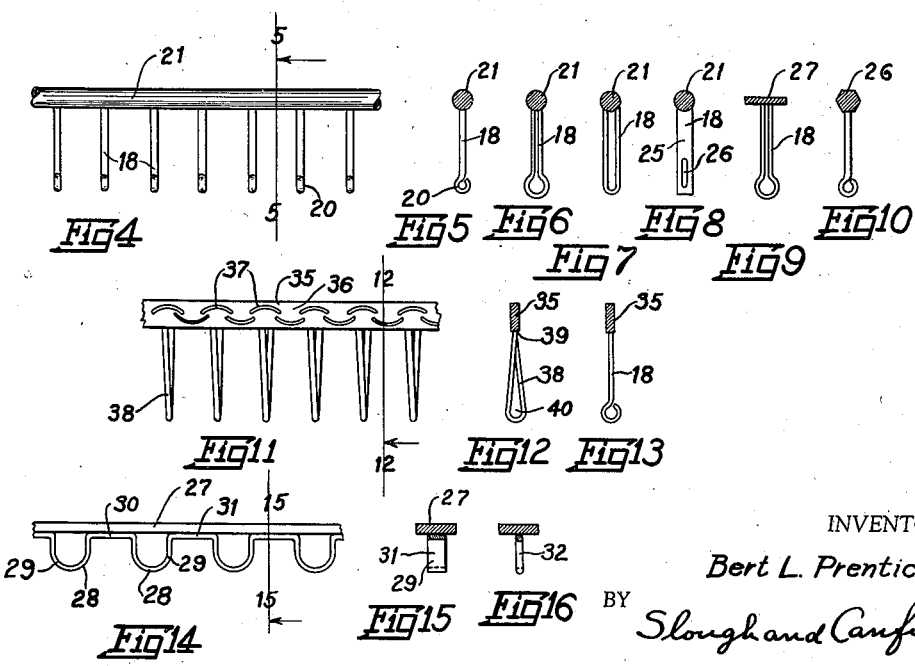
INVENTOR.
Bert L. Prentice.
BY Slough and Canfield
ATTORNEY.

Patented Oct. 15, 1935

2,017,511

UNITED STATES PATENT OFFICE 2,017,511

WINDOW FRAME CHANNEL

Bert L. Prentice, Cleveland Heights, Ohio, assignor to The Reid Products Company, Cleveland, Ohio, a corporation of Ohio Application April 29, 1932, Serial No. 608,195

2 Claims. (Cl. 296—44.5)

This invention relates to window frame constructions and particularly to the channel frames of automotive vehicle windows.

In the construction of automotive vehicles such as passenger automobiles, the window frames are provided with inwardly open channel frame members, the channels embracing the edges of the window glass. Such channels have been constructed of rubber or like material, in some cases rubber covered with felt or the like.

In modern automobile designs however, the corners of the window frames are in some instances curved and in attempting to bend or shape the channels to a rounded configuration in the window frame corners, the material of the channel, especially if made of rubber or like material tends to buckle or otherwise be distorted which renders it unsightly as well as impractical and inefficient as a window glass embracing element.

It is therefore an object of my invention to provide an improved window frame channel of the class referred to.

Another object is to provide a window frame channel which may be constructed of rubber or like material and which may be bent to conform to rounded window corners substantially without buckling or otherwise being distorted.

Another object is to provide an improved window frame channel having an improved neat finished appearance.

Another object is to provide an improved window frame channel material having associated therewith a structural element which both renders the channel aesthetically beautiful and gives it a finished appearance, as well as adapts the channel to be bent to conform it to the rounded corners of a window without buckling or otherwise distorting it.

Another object is to provide a finishing element adapted to be associated with a window frame channel of rubber or the like to render it substantially free from buckling when bent to conform it to the rounded corners of automobile windows and which may be constructed to give an aesthetically beautiful finished appearance to the channel.

Other objects will be apparent to those skilled in the art to which my invention appertains.

My invention is fully disclosed in the following description taken in connection with the accompanying drawing in which;

Fig. 1 is an elevational view of a fragment of the interior of an automotive vehicle such as a passenger automobile showing a window thereof to which my invention is applied;

Fig. 2 is a cross sectional view to an enlarged scale taken from the plane 2—2 of Fig. 1; or taken from the plane 2—2 of Fig. 3;

Fig. 3 is a view to an enlarged scale of a part of Fig. 1 the view being also taken from the plane of Fig. 2;

Fig. 4 is a view, shown separately, of an element of my invention illustrated in Figs. 2 and 3;

Fig. 5 is a view taken from the plane 5—5 of Fig. 4;

Figs. 6, 7, 8, 9, and 10, are views similar to Fig. 5 illustrating modifications;

Fig. 11 is a view similar to Fig. 4 illustrating a modification;

Fig. 12 is a view taken from the plane 12 of Fig. 11;

Fig. 13 is a view similar to Fig. 12 illustrating a modification;

Fig. 14 is a view similar to Fig. 4 illustrating still another modification;

Fig. 15 is a view taken from the plane 15 of Fig. 14; and

Fig. 16 is a view similar to Fig. 15 illustrating a modification.

Referring to the drawing, I have shown at 1, a channel composed of rubber or like material, generally rectangular in form comprising flanges 2—2 and a web portion 3. The outer ends of the flanges have inwardly extending confronting bead portions 4—4. The inner concave surface of the channel 1 as well as the bead portions 4 are covered with a layer of felt 5.

The channel 4, in the practice of my invention, is installed in window frame structural elements which may be of various construction. In the form of my invention illustrated, these structural elements comprise a sheet metal element 6 which in cross section is of angle form, comprising, in section, leg portions 7 and 8 against which respectively one of the flanges 2 of the channel and the web 3 of the channel are juxtaposed. The outer end of the leg portion is bent over to form a rounded edge 9 and continues in a portion 10.

The leg portion 8 continues beyond the web portion 3 of the channel as at 11; and a filler of wood 12 has a surface 13 disposed against the other channel flange 2 and a surface 14 disposed against the portion 11 of the element 6.

The rubber or the like channel 1 is thus disposed in a groove formed by the parts 7 and 8 and 12 above described.

Such a groove extends all the way around the frame of the window of Fig. 1, inwardly concave. Likewise a strip or length of the rubber channel 1, disposed in the groove extends all the way around the frame. The glass window 15 at its peripheral edge extends into the concavity of the channel preferably engaging the web of the channel on its felt cover 5 as at 16 and being engaged inwardly of the peripheral edges by the rounded felt covered bead portions 4—4 of the channel.

The above described construction is substantially the same as that of the prior art and in itself constitutes no essential part of my invention.

During the process of manufacturing or molding the rubber channel 1, as at 17—17, I embed therein a plurality of anchoring devices 18—18, which may be variously formed as will presently appear but being generally elongated and embedded in the channel flanges 2—2 extending from the outer end of the channel flanges as at 19—19 to a point in the channel flange which in the form of my invention illustrated is approximately halfway from the end of the flange at 19 to the web 3 of the flange.

In the form illustrated in Figs. 2 to 5 inclusive, the devices 18 are in the form of a wire bent at the inner end to provide an eye 20 and at the outer end joined as by butt-welding to a wire or bead 21, the bead, when the devices are embedded in the channel flanges, being disposed along the outer termination of the channel flange. The bead 21 and devices 18 are preferably first formed as illustrated in Fig. 4 as a separate unit, for example as a continuous strip of length great enough for at least one window. The bead portion 21 with its attached devices 18 is placed in the mold in which the channel 1 is formed and during the process of molding the channel, the devices 18 are embedded therein as illustrated and as above described to make a strip of channel material with the beads 21 thereon and the devices 21 embedded therein.

Such a strip of rubber channel may now be installed in the above described groove of the window frame construction and when the channel is bent to conform to the rounded corners of the window, it is prevented from buckling or otherwise becoming distorted by the rigid metal bead 21 and the devices 18 integral therewith and embedded in the rubber. Furthermore, when the channel is thus installed, it is given a finished and æsthetically beautiful appearance by the visible bead 21 and to this end, the bead may be given any desired metal finish for example, as by chromium plating, or by being lacquered in any desired color.

In turning a corner with the improved rubber channel above described, the devices 18 may take the generally radial positions indicated in Fig. 1.

Instead of employing a single wire having an eye 20 on the end thereof, as described above, the anchoring devices may be formed as in Fig. 6 of a double wire having a loop on the end opposite the bead 21; or as in Fig. 7 it may be a continuous loop; or as in Fig. 8 may be a stamping of sheet metal 25 having a perforation 26.

In all of these forms, it will be observed that the device 18 comprises an elongated body secured at one end to the bead 21 and having either at its opposite end or throughout its length an eye or other perforation through which the rubber in the molding process may flow to anchor the device in the rubber.

In the form of Fig. 10, the bead 26 is hexagonal in cross sectional form instead of circular as in the other forms described.

In Fig. 9 a flat bead 27 is shown having an anchoring device 18 similar to that in Fig. 6.

In Figs. 14 and 15, a relatively flat bead 27 is illustrated. In this form the anchoring devices 28—28 are formed from a continuous piece of wire having depending loops 29—29 joined to the bead 27 by intermediate portion 30 lying flat against the underside of the bead 27. The wire 31 from which the loops 29 and intermediate portion 30 are formed may be of rectangular cross section as illustrated in Fig. 27 or it may be a round wire 32 as illustrated in Fig. 16.

In the form shown in Figs. 11 and 12, a bead 35 is shown disposed vertically edgewise to provide a relatively extensive surface 36 upon which any desired ornamentation 37 may be formed or applied. In this form also the anchoring devices 38 are formed from a loop of wire but welded at both its upper ends as at 39 to an edge of the bead 35 and having a loop at 40 at its opposite end.

In the modification of Fig. 13, the bead 35 may have devices 18 similar to those of Figs. 2 to 5 inclusive.

It will thus appear that my invention may be embodied in numerous forms and modifications and my invention is not limited to the modifications illustrated and described inasmuch as many other forms and modifications may be devised within the scope and spirit of my invention without sacrificing its advantages.

While I have described the channel employed in my invention as molded, it will be understood that this term in the specification and claims comprehends channels made by other processes such for example as extruding processes.

While I have illustrated and described my invention as applied to a window frame channel in which a glass pane may be supported and may slide in the well known manner, my invention has other applications. For example, the channel of my invention may be employed to circumscribe and finish the outer edges of an article such as an automotive vehicle windshield. In this connection the channel of rubber or the like bendable material may be a true channel in cross-section or may be of other generally channel form. In this and in other uses, not identified strictly with a window frame window guiding channel, the advantages of my invention whereby a bead may be secured to the rubber or like material and may bend therewith in conforming the material to the desired shape, may be enjoyed.

I claim:

1. As an article of manufacture adapted to be associated with a bendable molded rubber or like channel during the manufacture of the same, a bendable strip of bead material and a longitudinal series of elongated anchoring elements extending laterally therefrom and joined to the bead strip on longitudinally spaced portions of lesser extent than the spaces between adjacent elements.

2. As an article of manufacture adapted to be associated with a bendable molded rubber or like channel during the manufacture of the same, a bendable strip of bead material and a longitudinal series of elongated anchoring elements extending laterally therefrom and joined to the bead strip on longitudinally spaced portions thereof of longitudinal extent at least as small as the spaces between adjacent elements.

BERT L. PRENTICE.